(12) United States Patent
Yang et al.

(10) Patent No.: US 9,605,429 B2
(45) Date of Patent: Mar. 28, 2017

(54) ASSEMBLY UNIT AND ASSEMBLY INCLUDING SAME

(71) Applicant: SEGI SYNTHETIC ENVIRONMENT CO., LTD., Jeonju-si Jeollabuk-do (KR)

(72) Inventors: Ki Hae Yang, Jeonju-si (KR); Byoung Soon Song, Jeonju-si (KR)

(73) Assignee: SEGI SYNTHETIC ENVIRONMENT CO., LTD., Jeonju-si, Jeollabuk-Do (KR)

(*) Notice: Subject to any disclaimer, the term of this patent is extended or adjusted under 35 U.S.C. 154(b) by 0 days.

(21) Appl. No.: 15/029,282

(22) PCT Filed: Sep. 24, 2014

(86) PCT No.: PCT/KR2014/008864
§ 371 (c)(1),
(2) Date: Apr. 14, 2016

(87) PCT Pub. No.: WO2015/056895
PCT Pub. Date: Apr. 23, 2015

(65) Prior Publication Data
US 2016/0230387 A1    Aug. 11, 2016

(30) Foreign Application Priority Data

Oct. 14, 2013   (KR) .................. 10-2013-0121901

(51) Int. Cl.
*E04C 1/00*    (2006.01)
*E04B 5/00*    (2006.01)
(Continued)

(52) U.S. Cl.
CPC .............. *E04C 1/24* (2013.01); *A63H 33/04* (2013.01); *A63H 33/06* (2013.01); *C02F 1/283* (2013.01);
(Continued)

(58) Field of Classification Search
CPC . E04B 1/38; E02B 27/425; E02B 2/44; E02B 3/14; E02B 1/38; C02F 1/283; E04C 1/24
See application file for complete search history.

(56) References Cited

U.S. PATENT DOCUMENTS 2,814,080 A * 11/1957 Tvorik .................. E04F 13/042
                                                        52/417
3,203,124 A *  8/1965 Stoessel ................. A47F 5/118
                                                        40/539
(Continued)

FOREIGN PATENT DOCUMENTS

JP           3175606       4/2012
KR         20-0406229      1/2006
(Continued)

OTHER PUBLICATIONS

International Search Report for International Application No. PCT/KR2014/008864, dated Dec. 10, 2014.

*Primary Examiner* — Beth Stephan
(74) *Attorney, Agent, or Firm* — Kile Park Reed & Houtteman PLLC

(57) ABSTRACT

Provided is an assembly unit including 3×N (here, N is a natural number) number of polygonal surface parts, which extend in a vertical direction and have flat surfaces, connecting parts connecting end portions, which are adjacent to each other, of end portions of each of the polygonal surface parts, and coupling protrusions respectively protruding from the polygonal surface parts in a horizontal direction that is perpendicular to the vertical direction. The three polygonal surface parts in a clockwise direction are defined as one set, and the coupling protrusions respectively have formation positions that sequentially increase in height within the one set in the vertical direction.

11 Claims, 2 Drawing Sheets

(51) Int. Cl.
*E04B 2/44* (2006.01)
*E04B 2/50* (2006.01)
*A63H 33/04* (2006.01)
*C02F 1/28* (2006.01)
*E02B 3/14* (2006.01)
*E02D 27/42* (2006.01)
*E04B 1/38* (2006.01)
*A63H 33/06* (2006.01)
*E04B 2/18* (2006.01)
*E04B 2/22* (2006.01)

(52) U.S. Cl.
CPC .............. *E02B 3/14* (2013.01); *E02D 27/425* (2013.01); *E04B 1/38* (2013.01); *E04B 2/18* (2013.01); *E04B 2/22* (2013.01); *E04B 2/44* (2013.01); *E04B 2/50* (2013.01)

(56) References Cited

U.S. PATENT DOCUMENTS

| | | | | |
|---|---|---|---|---|
| 3,654,717 A * | 4/1972 | Lane | ................. | G09F 1/02 156/204 |
| 4,095,386 A * | 6/1978 | Johnson | ................. | A63H 33/04 229/110 |
| 4,474,504 A * | 10/1984 | Whitman | ................. | E02B 3/14 404/40 |
| RE32,663 E * | 5/1988 | Atkinson | ................. | E02B 3/14 404/40 |
| 4,875,803 A * | 10/1989 | Scales | ................. | E02B 3/14 404/41 |
| 5,782,667 A * | 7/1998 | Luby | ................. | A63F 9/12 446/117 |
| 5,906,456 A * | 5/1999 | Knight | ................. | E02B 3/14 404/41 |
| 6,186,856 B1 * | 2/2001 | Chen | ................. | A63H 33/04 446/117 |
| 7,870,691 B2 * | 1/2011 | Williams | ................. | E04D 11/002 405/20 |
| 2005/0193668 A1 * | 9/2005 | Hamilton | ................. | E04F 13/042 52/371 |
| 2008/0245026 A1 * | 10/2008 | Hamilton | ................. | E04F 13/04 52/698 |

FOREIGN PATENT DOCUMENTS

| | | |
|---|---|---|
| KR | 10-2008-0054662 | 6/2008 |
| KR | 10-2011-0015144 | 2/2011 |

* cited by examiner

ASSEMBLY UNIT AND ASSEMBLY INCLUDING SAME

TECHNICAL FIELD

The present disclosure relates to an assembly unit and an assembly manufactured by assembling a plurality of assembly units with each other, and more particularly, to an assembly unit for constituting facilities or equipment and an assembly assembled by coupling the assembly units to each other.

BACKGROUND ART

In the related art, multi-household houses such as an apartment or a townhouse where many households reside are built by architectural technologies in which working processes such as a foundation work, frame manufacturing for shape construction, a rebar work, a pipe work, concrete mix using a remicon truck, injecting (pouring), and solidifying (curing) are sequentially performed by using mainly concrete. When the processed concrete becomes stable after the solidifying (curing) is completed, the frame is removed and then processes such as the rebar work for a pillar, the frame manufacturing, the concrete mix, the injecting (pouring), and the solidifying (curing) are performed again to complete an initial floor. Since then, the above-described work processes are sequentially repeated for the next floor.

However, when the multi-household houses such as the apartment or the townhouse are built by the above-described architectural processes, as the working processes such as the foundation work, the frame manufacturing, the rebar work, the pipe work, the concrete mix, the injecting (pouring), and the solidifying (curing) are sequentially and repeatedly performed, much time, many personnel, and expensive construction costs are required during the entire construction schedule. Also, it is difficult to maintain uniform quality of a building in terms of techniques of working personnel, environment such as weather and temperature, materials such as a concrete strength according to materials such as sands, cement, and rebar.

DISCLOSURE OF THE INVENTION

Technical Problem

The present disclosure provides an assembly unit that has stability and, at the same time, is easily assembled according to a size and shape thereof.

The present disclosure also provides an assembly using a plurality of assembly units that has stability and, at the same time, is easily assembled according to a size and shape thereof.

Technical Solution

In accordance with an exemplary embodiment, an assembly unit includes: 3×N (here, N is a natural number) number of polygonal surface parts, which extend in a vertical direction and have flat surfaces; connecting parts connecting end portions, which are adjacent to each other, of end portions of each of the polygonal surface parts; and coupling protrusions respectively protruding from the polygonal surface parts in a horizontal direction that is perpendicular to the vertical direction. The three polygonal surface parts in a clockwise direction are defined as one set, and the coupling protrusions respectively have formation positions that sequentially increase in height within the one set in the vertical direction. Here, the coupling protrusions may be disposed overall in a stair shape within the one set.

The polygonal surface parts may include first to sixth polygonal surfaces in the clockwise direction, and the coupling protrusions may include first to sixth coupling protrusions that are defined in the clockwise direction, and the first and fourth coupling protrusions may have the same formation position as each other, the second and fifth coupling protrusions may have the same formation position as each other, and the third and sixth coupling protrusions may have the same formation position as each other.

A coupling groove may be defined in each of the coupling protrusions in the vertical direction.

Each of the polygonal surface parts may further include a recessed surface, and the flat surface and the recessed surface may be alternately disposed on each of the polygonal surface parts in the clockwise direction. Here, each of the coupling protrusions may protrude from the recessed surface in the horizontal direction.

In accordance with another exemplary embodiment, an assembly includes: a first assembly unit including: 3×N (here, N is a natural number) number of polygonal surface parts, which extend in a vertical direction and have flat surfaces; connecting parts connecting end portions, which are adjacent to each other, of end portions of each of the polygonal surface parts; and coupling protrusions respectively protruding from the polygonal surface parts in a horizontal direction that is perpendicular to the vertical direction, in which the three polygonal surface parts in a clockwise direction are defined as one set, and the coupling protrusions respectively have formation positions that sequentially increase in height within the one set in the vertical direction; and second and third assembly units having the same structure as that of the first assembly unit, in which the coupling protrusions provided to each of the first to third assembly units are stacked with and coupled to each other.

The polygonal surface parts provided in the first assembly unit may include first to sixth polygonal surfaces in the clockwise direction, and the coupling protrusions provided in the first assembly unit may include the first to sixth coupling protrusions defined in the clockwise direction, and the first and fourth coupling protrusions may have the same formation position as each other, the second and fifth coupling protrusions may have the same formation position as each other, and the third and sixth coupling protrusions may have the same formation position as each other.

A coupling groove may be vertically defined in each of the coupling protrusions provided in the first assembly unit. Here, the assembly may further include a coupling member passing through the coupling grooves in a state in which the coupling protrusions provided in the first to third assembly units are stacked with each other to couple the first to third assembly units to each other.

Each of the polygonal surface parts provided in the first assembly unit may further include a recessed surface, and the flat surface and the recessed surface may be alternately disposed on each of the polygonal surface parts. Here, each of the coupling protrusions may protrude from the recessed surface in a horizontal direction.

Advantageous Effects

In accordance with an exemplary embodiment, as the assembly unit is constituted by the polygonal column and includes the coupling protrusions respectively having the formation positions that are different from each other in the vertical direction, when the assembly unit is coupled to a different assembly unit, the coupling protrusions are stacked with each other to easily couple the assembly units to each other.

BEST MODE FOR CARRYING OUT THE INVENTION

Figure 1:
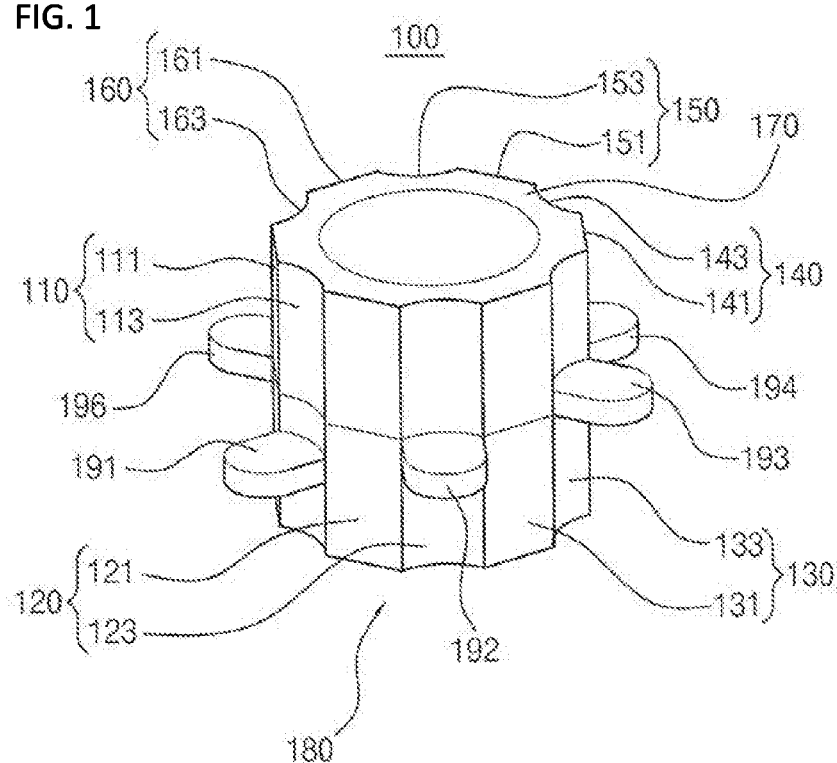
FIG. 1 is a perspective view for explaining an assembly unit in accordance with an exemplary embodiment.

In accordance with an exemplary embodiment, an assembly unit includes: polygonal surface parts each of which has 3×N (here, N is a natural number) flat surfaces and extends in a vertical direction; connecting parts configured to connect end portions, which are adjacent to each other, of the end portions of the polygonal surface parts; and coupling protrusions respectively protruding from the polygonal surface parts in a horizontal direction that is perpendicular with respect to the vertical direction, and the three polygonal surface parts in a clockwise direction are defined as one set to have formation positions that sequentially increase in the vertical direction within the one set. Here, the one set of the coupling protrusions may be disposed in a stair shape.

MODE FOR CARRYING OUT THE INVENTION

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

It will also be understood that when an element or layer is referred to as being 'on' another one, it can be directly on the other one, or one or more intervening elements or layers may also be present. On the other hand, it will be understood that when an element is directly disposed on or connected to another one, further another element can not be present therebetween. Also, though terms like a first, a second, and a third are used to describe various elements, compositions, regions and/or layers in various embodiments of the present invention, the elements, compositions, regions and/or layers are not limited to these terms.

In the following description, the technical terms are used only for explaining a specific exemplary embodiment while not limiting the present invention. Also, unless otherwise defined, all terms, including technical and scientific terms used herein have the same meaning as commonly understood by one of ordinary skill in the art to which the invention pertains. In conventional dictionaries, such as those limited to the above terms are described in the related art of the present invention and their meaning in the context of matching will be interpreted as having a meaning, unless clearly limited ideally or excessively outward intuit will not be interpreted.

The embodiments of the present invention are described with reference to the cross-sectional drawings, i.e., the schematic drawings of ideal embodiments of the inventive concept. Accordingly, variations caused by shapes of the drawings, e.g., variations of manufacturing methods and/or tolerances, may be expected. Thus, the embodiments of the present invention are not limited to specific shapes of the areas illustrated in the drawings but include deviations in the shapes. The areas illustrated in the drawings are schematically illustrated. The shapes are not intended to explain the exact shape of the area and also limit the scope of the present invention.

Preferred embodiments of the present invention will be described below in more detail with reference to the accompanying drawings.

Figure 2:
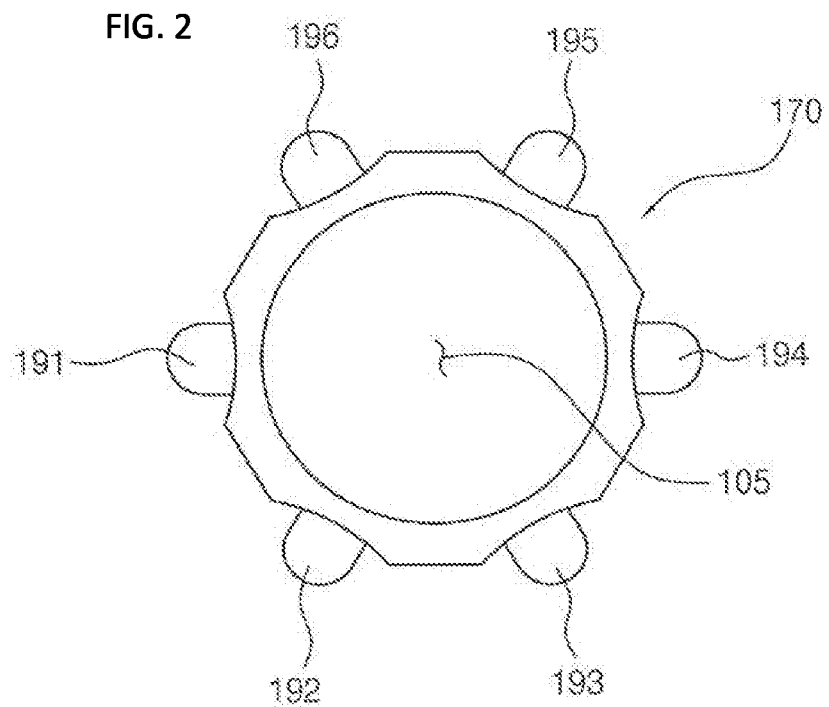
FIG. 2 is a plan view for explaining the assembly unit of FIG. 1.

FIG. 1 is a perspective view for explaining an assembly unit in accordance with an exemplary embodiment. FIG. 2 is a plan view for explaining the assembly unit of FIG. 1.

Referring to FIGS. 1 and 2, in accordance with an exemplary embodiment, an assembly unit 100 includes polygonal surface parts 110, 120, 130, 140, 150, and 160, connecting parts 170 and 180, and coupling protrusions 191, 192, 193, 194, 195, and 196. Thus, the assembly unit 100 may have a column shape like a polygonal column. A plurality of assembly units may be stacked and assembled overall into one assembly.

The polygonal surface parts 110, 120, 130, 140, 150, and 160 are provided to vertically extend. The polygonal surface parts 110, 120, 130, 140, 150, and 160 are coupled to each other.

The polygonal surface parts 110, 120, 130, 140, 150, and 160 include outer flat surfaces 111, 121, 131, 141, 151, and 161, respectively. 3×N (here, N is a natural number) number of the polygonal surface parts 110, 120, 130, 140, 150, and 160 is provided. Thus, as each of the polygonal surface parts 110, 120, 130, 140, 150, and 160 constitutes one surface of the polygonal column, the assembly unit 100 may have the polygonal column shape.

For example, the six polygonal surface parts 110, 120, 130, 140, 150, and 160 may be provided (the polygonal column is constituted by the six polygonal surface parts 110, 120, 130, 140, 150, and 160) to include first to sixth polygonal surface parts 110, 120, 130, 140, 150, and 160. Here, the assembly unit 100 may have a hexagonal column shape. In this case, when the three assembly units 100 are coupled to each other, the outer surfaces, which are adjacent to each other, of the outer flat surfaces 111, 121, 131, 141, 151, and 161 of the assembly units 100 may contact each other.

The connecting parts 170 and 180 connect end portions, which are adjacent to each other, of end portions of the polygonal surface parts 110, 120, 130, 140, 150, and 160 to each other. Each of the connecting parts 170 and 180 may have a plate shape. Meanwhile, a through-hole may be defined in each of the connecting parts 170 and 180 to form a hollow part 105.

The coupling protrusions 191, 192, 193, 194, 195, and 196 may protrude from the polygonal surface parts 110, 120, 130, 140, 150, and 160 in a horizontal direction perpendicular to the vertical direction, respectively. For example, the coupling protrusions 191, 192, 193, 194, 195, and 196 may protrude from the outer flat surfaces 111, 121, 131, 141, 151, and 161, respectively.

The coupling protrusions 191, 192, 193, 194, 195, and 196 may define three of the polygonal surface parts 110, 120, 130, 140, 150, and 160 in a clockwise direction as one set. In this case, the coupling protrusions 191, 192, and 193 of the one set may respectively have formation positions that sequentially increase in height in the vertical direction. On the contrary, the coupling protrusions 191, 192, and 193 of the one set may respectively have formation positions that sequentially decrease in height in the vertical direction. Thus, the coupling protrusions 191, 192, and 193 within the one set may be disposed in a stair shape.

In accordance with an exemplary embodiment, the six polygonal surface parts 110, 120, 130, 140, 150, and 160 may be provided so that the assembly unit 100 has the hexagonal column shape. In this case, the coupling protrusions 191, 192, 193, 194, 195, and 196 may include the first to sixth coupling protrusions 191, 192, 193, 194, 195, and 196 in the clockwise direction. Here, the first and fourth coupling protrusions 191 and 194 may have the same formation position as each other, the second and fifth coupling protrusions 192 and 195 may have the same formation position as each other, and the third and sixth coupling protrusions 193 and 196 may have the same formation position as each other. Thus, when the three assembly units 100 are connected to each other, as coupling protrusions, which are adjacent to each other, of coupling protrusions of the three assembly units 100 are stacked to have a stacked coupling structure, the three assembly units 100 may be assembled with each other.

In accordance with an exemplary embodiment, each of the coupling protrusions 191, 192, 193, 194, 195, and 196 may have a vertical thickness that gradually decreases toward the outside with respect to a horizontal central line thereof. Thus, when the three assembly units 100 are connected to each other, as the coupling protrusions of the three assembly units 100 are stably stacked to have the stacked coupling structure, the three assembly units 100 may be assembled with each other.

In accordance with an exemplary embodiment, a recess groove (not shown) may be defined in each of the polygonal surface parts 110, 120, 130, 140, 150, and 160. Since each of the coupling protrusions 191, 192, 193, 194, 195, and 196 are provided in the recess groove, the coupling protrusions 191, 192, 193, 194, 195, and 196 may be provided to protrude a length equal to or less than a depth of the recess groove from the outer flat surfaces 111, 121, 131, 141, 151, and 161, respectively. In this case, when the three assembly units 100 are connected to each other, the coupling protrusions of the three assembly units 100 are stably stacked. Thus, as the outer flat surfaces 111, 121, 131, 141, 151, and 161 in the polygonal surface part contact each other and the coupling protrusions have the stacked coupling structure, the three assembly units 100 may be stably assembled with each other.

In accordance with an exemplary embodiment, each of the polygonal surface parts 110, 120, 130, 140, 150, and 160 may further include outer recessed surfaces 113, 123, 133, 143, 153, and 163 extending in the vertical direction. Accordingly, the polygonal surface parts 110, 120, 130, 140, 150, and 160 may include outer flat surfaces 111, 121, 131, 141, 151, and 161 and the outer recessed surfaces 113, 123, 133, 143, 153, and 163, respectively. Thus, the coupling protrusions 191, 192, 193, 194, 195, and 196 may be disposed in the outer recessed surfaces 113, 123, 133, 143, 153, and 163, respectively. When the three assembly units 100 are connected to each other, each of the coupling protrusions 191, 192, 193, 194, 195, and 196 may be sequentially stacked so that outer flat surfaces, which are adjacent to each other, of the outer flat surfaces 111, 121, 131, 141, 151, and 161 may contact each other. As a result, the assembly in which the three assembly units 100 are coupled to each other may have the stable structure.

In accordance with an exemplary embodiment, each of the coupling protrusions 191, 192, 193, 194, 195, and 196 may be provided with a coupling groove (not shown) passing therethrough. When the plurality of assembly units 100 constitute the assembly by stacking the plurality of coupling protrusions 191, 192, 193, 194, 195, and 196 with each other, coupling members (not shown) may be disposed in the coupling grooves, respectively. Thus, the assembly may have the stable structure.

Figure 3:
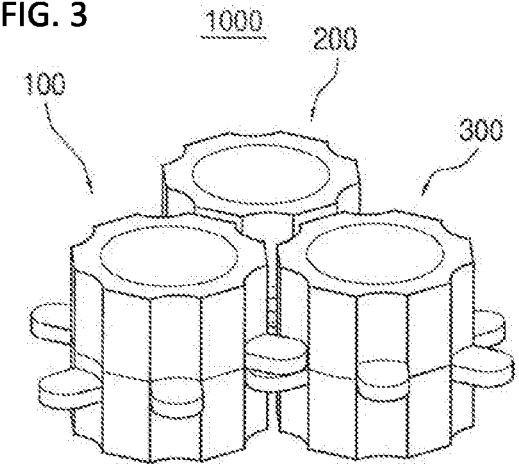
FIG. 3 is a perspective view for explaining an assembly in accordance with an exemplary embodiment.
Figure 4:
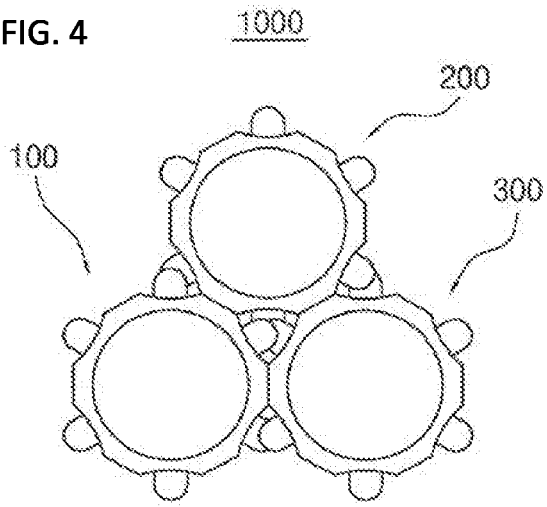
FIG. 4 is a plan view for explaining the assembly of FIG. 3.

FIG. 3 is a perspective view for explaining the assembly in accordance with an exemplary embodiment. FIG. 4 is a plan view for explaining the assembly of FIG. 3.

Referring to FIGS. 3 and 4, in accordance with an exemplary embodiment, an assembly 1000 includes a first assembly unit 100, a second assembly unit 200, and a third assembly unit 300.

Since the first assembly unit 100 is described above with reference to FIGS. 1 and 2, description for this will be omitted.

The second and third assembly units 200 and 300 have substantially the same structure as that of the first assembly unit 100.

A first coupling protrusion, a second coupling protrusion, and a third coupling protrusion, which are respectively provided in the first to third assembly units 100, 200, and 300 and have heights different from each other, may be stacked with and coupled to each other Accordingly, the assembly 100 may have a honeycomb structure.

In accordance with an exemplary embodiment, each of the coupling protrusions may be provided with a coupling groove (not shown) passing therethrough in the vertical direction. The assembly 1000 in which the first to third assembly units 100, 200, and 300 are constituted by stacking the plurality of coupling protrusions with each other may include coupling members (not shown) in the coupling grooves. Thus, the assembly 100 may have the stable structure. For example, the coupling member may include a bolt, a nail, or the like.

As the assembly 1000 includes the plurality of assembly units 100, 200, and 300 that are coupled to each other in the vertical and horizontal directions, the assembly 1000 may be used for a toy or a water purification device. Also, as the assembly unit is made of carbon fiber, the assembly unit may float on the sea. Accordingly, the assembly 1000 including the assembly units may be applied to an offshore wind power generator floating on the sea. Furthermore, the assembly 1000 may be applied to a building for a floating ocean city floating on the sea.

Figure 5:
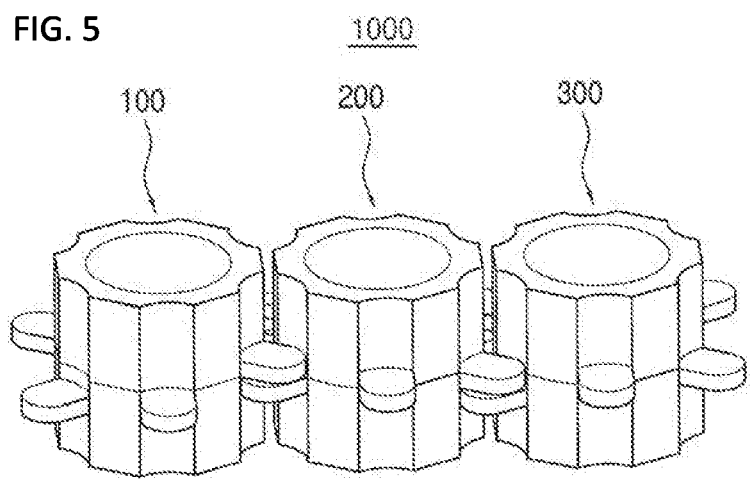
FIG. 5 is a perspective view for explaining the assembly in accordance with an exemplary embodiment.

FIG. 5 is a perspective view for explaining the assembly in accordance with an exemplary embodiment.

Referring to FIG. 5, in accordance with an exemplary embodiment, the assembly 1000 may include the plurality of assembly units 100, 200, and 300. The assembly units 100, 200, and 300 may be arranged in one direction. That is, as the assembly units 100, 200, and 300 are arranged in various directions, the assembly 1000 may have variously modified shapes and sizes.

Although the assembly unit and assembly including the same have been described with reference to the specific embodiments, they are not limited thereto. Therefore, it will be readily understood by those skilled in the art that various modifications and changes can be made thereto without departing from the spirit and scope of the present invention defined by the appended claims.

INDUSTRIAL APPLICABILITY

In accordance with an exemplary embodiment, an assembly unit and an assembly including the same may be used for a toy, a water purification device, or a shore protection block. Also, as the assembly unit is made of carbon fiber, the assembly unit may float on the sea. Thus, the assembly including the assembly units may be applied to an offshore wind power generator floating on the sea. Furthermore, the assembly may be applied to a building for a floating ocean city floating on the sea.

The invention claimed is:

1. An assembly unit comprising:
    3×N (here, N is a natural number) number of polygonal surface parts, which extend in a vertical direction and have flat surfaces;
    connecting parts connecting end portions, which are adjacent to each other, of end portions of each of the polygonal surface parts; and
    coupling protrusions respectively protruding from the polygonal surface parts in a horizontal direction that is perpendicular to the vertical direction,
    wherein three of the polygonal surface parts in a clockwise direction are defined as one set, and the coupling protrusions respectively have formation positions that sequentially increase in height measured from a lower one of the connecting parts within the one set in the vertical direction.

2. The assembly unit of claim 1, wherein the polygonal surface parts comprises first to sixth polygonal surfaces in the clockwise direction, and the coupling protrusions comprises first to sixth coupling protrusions that are defined in the clockwise direction, and
    the first and fourth coupling protrusions have the same formation position as each other, the second and fifth coupling protrusions have the same formation position as each other, and the third and sixth coupling protrusions have the same formation position as each other.

3. The assembly unit of claim 1, wherein a coupling groove is defined in each of the coupling protrusions in the vertical direction.

4. The assembly unit of claim 1, wherein each of the polygonal surface parts further comprises a recessed surface, and the flat surface and the recessed surface are alternately disposed on each of the polygonal surface parts in the clockwise direction.

5. The assembly unit of claim 4, wherein each of the coupling protrusions protrudes from the recessed surface of one of the polygonal surface parts in the horizontal direction.

6. An assembly comprising:
    a first assembly unit comprising: 3×N (here, N is a natural number) number of polygonal surface parts, which extend in a vertical direction and have flat surfaces; connecting parts connecting end portions, which are adjacent to each other, of end portions of each of the polygonal surface parts; and coupling protrusions respectively protruding from the polygonal surface parts in a horizontal direction that is perpendicular to the vertical direction, wherein three of the polygonal surface parts in a clockwise direction are defined as one set, and the coupling protrusions respectively have formation positions that sequentially increase in height measured from a lower one of the connecting parts within the one set in the vertical direction; and
    second and third assembly units having the same structure as that of the first assembly unit,
    wherein the coupling protrusions provided to each of the first to third assembly units are stacked with and coupled to each other.

7. The assembly of claim 6, wherein the polygonal surface parts provided in the first assembly unit comprise first to sixth polygonal surfaces in the clockwise direction, and the coupling protrusions provided in the first assembly unit comprise the first to sixth coupling protrusions defined in the clockwise direction, and
    the first and fourth coupling protrusions have the same formation position as each other, the second and fifth coupling protrusions have the same formation position as each other, and the third and sixth coupling protrusions have the same formation position as each other.

8. The assembly of claim 6, wherein a coupling groove is vertically defined in each of the coupling protrusions provided in the first assembly unit.

9. The assembly of claim 8, further comprising a coupling member passing through the coupling grooves in a state in which the coupling protrusions provided in the first to third assembly units are stacked with each other to couple the first to third assembly units to each other.

10. The assembly of claim 6, wherein each of the polygonal surface parts provided in the first assembly unit further comprises a recessed surface, and the flat surface and the recessed surface are alternately disposed on each of the polygonal surface parts.

11. The assembly of claim 10, wherein each of the coupling protrusions protrudes from the recessed surface of one of the polygonal surface parts in a horizontal direction.

* * * * *